(12) United States Patent
Ota et al.

(10) Patent No.: US 6,354,111 B1
(45) Date of Patent: *Mar. 12, 2002

(54) PRESS-FORMING DIE FOR GLASS ELEMENTS

(75) Inventors: Takashi Ota, Kasugai; Masashi Fukuyama, Komaki; Hitoshi Hasegawa, Kounan; Kazutoshi Tohyama, Nakatsugawa, all of (JP)

(73) Assignees: NGK Insulators Ltd.; NGK Optoceramics, Ltd., both of Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,081

(22) Filed: Dec. 14, 1998

(30) Foreign Application Priority Data

Dec. 16, 1997 (JP) .............................................. 9-346838
Nov. 27, 1998 (JP) ............................................ 10-336794

(51) Int. Cl.⁷ .............................................. C03B 11/06
(52) U.S. Cl. .................................................. 65/374.11
(58) Field of Search ..................................... 65/374.11

(56) References Cited

U.S. PATENT DOCUMENTS 4,721,518 A    1/1988    Monji et al. ............. 65/374.11

FOREIGN PATENT DOCUMENTS

| | | |
|---|---|---|
| DE | 3428092 A1 | 2/1986 |
| EP | 0 404 481 | 12/1990 |
| EP | 0 567 896 | 11/1993 |
| EP | 0 608 566 A2 | 8/1994 |
| EP | 0 636 585 | 2/1995 |
| JP | 61-256931 | 11/1986 |
| JP | 62-3031 * | 1/1987 |
| JP | 64-72931 | 3/1989 |
| JP | 4-238823 | 8/1992 |
| JP | 7-218739 | 8/1995 |
| JP | 8-211244 | 8/1996 |
| JP | 9-90151 | 4/1997 |

OTHER PUBLICATIONS

Patent Abstracts of Japan, Japanese Laid–Open Patent Publication No. 1–192733, Aug. 2, 1989.

Patent Abstracts of Japan, Japanese Laid–Open Patent Publication No. 62–256732, Nov. 9, 1987.

* cited by examiner

*Primary Examiner*—Sean Vincent
(74) *Attorney, Agent, or Firm*—Burr & Brown

(57) ABSTRACT

A platinum thin film having a thickness of 0.01 to 5 $\mu$m is formed by means of the sputtering method on a press face of a die based on the use of a cemented carbide base material. A nickel thin film having a thickness of 0.05 to 0.5 $\mu$m and a thin film made of an alloy of platinum and iridium are allowed to intervene between the cemented carbide base material and the platinum thin film, if necessary. Alternatively, an alloy thin film having a thickness of 0.01 to 5 $\mu$m, which contains 10 to 70% by weight of iridium and 30 to 90% by weight of one or more species of metals selected from metals of the platinum group except for iridium, may be allowed to intervene between the cemented carbide base material and the platinum thin film.

6 Claims, 9 Drawing Sheets

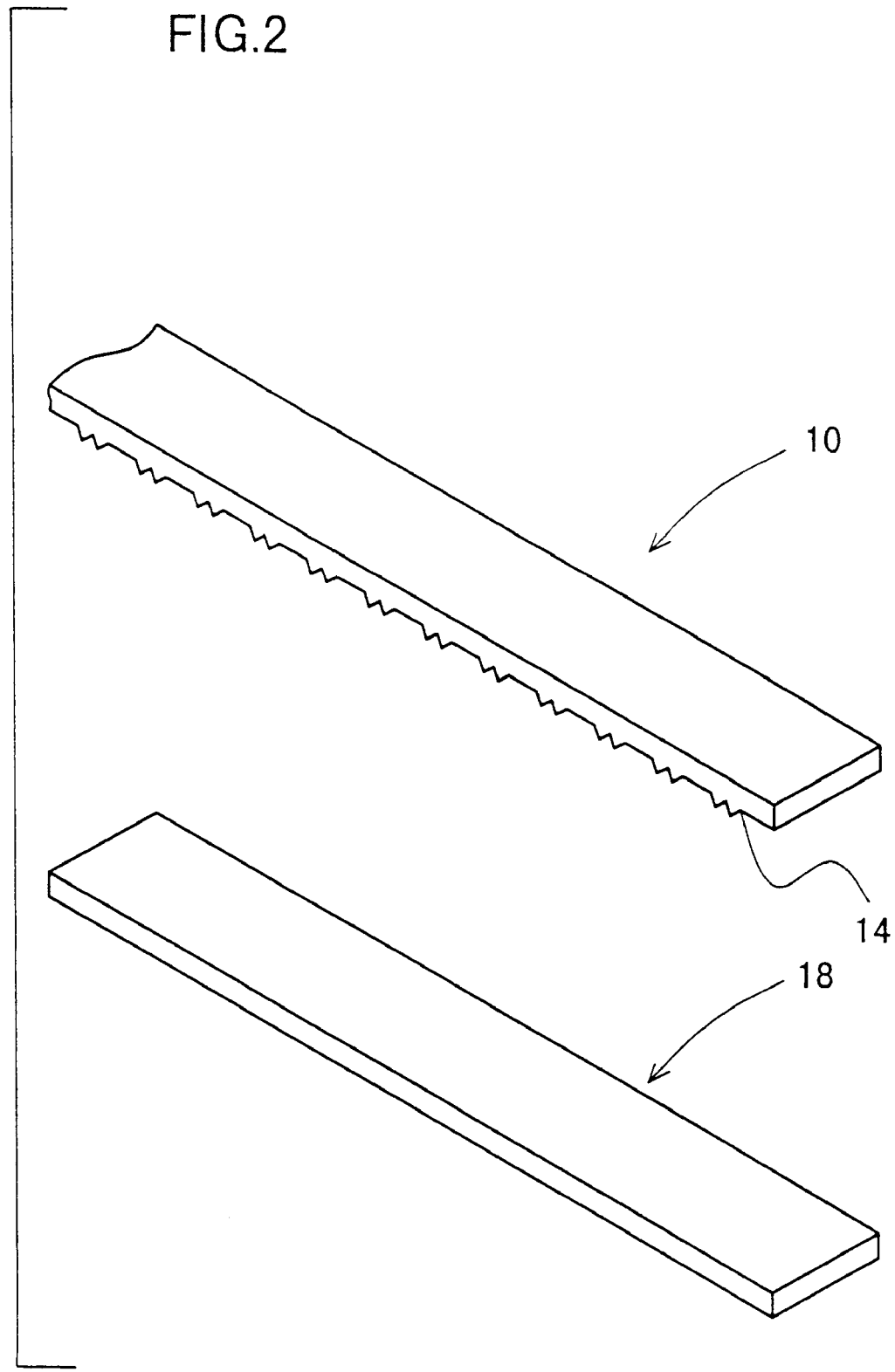

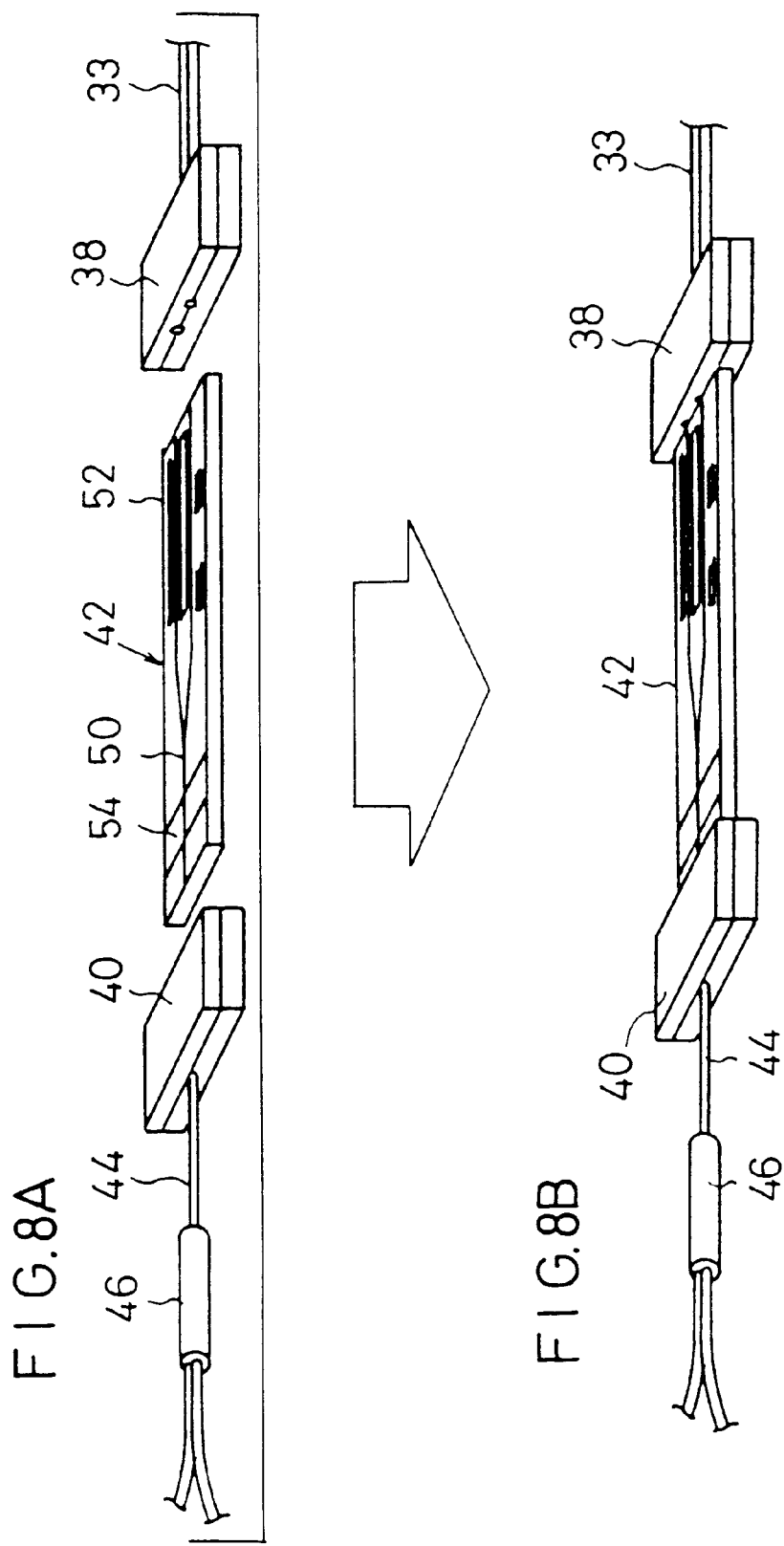

FIG. 9

| TYPE OF GLASS MATERIAL | FORMING TEMPERATURE | FORMING TIME | FORMING PRESSURE | OPEN PROCESS TEMPERATURE | SECONDARY FORMING PRESSURE | CYCLE TIME |
|---|---|---|---|---|---|---|
| PP-4<br>COEFFICIENT OF THERMAL EXPANSION $92 \times 10^{-7}$/°C<br>Tg 530°C<br>Ts 550°C | 600°C | 90 SECONDS | 800Kgf | 450°C | 300Kgf | 8 MINUTES |
| PC-4<br>COEFFICIENT OF THERMAL EXPANSION $68 \times 10^{-7}$/°C<br>Tg 535°C<br>Ts 574°C | 610°C | 90 SECONDS | 800Kgf | 410°C | 300Kgf | 8 MINUTES |
| BK-7<br>COEFFICIENT OF THERMAL EXPANSION $87 \times 10^{-7}$/°C<br>Tg 555°C<br>Ts 620°C | 680°C | 90 SECONDS | 800Kgf | 550°C | 300Kgf | 9 MINUTES |
| PYREX<br>COEFFICIENT OF THERMAL EXPANSION $32 \times 10^{-7}$/°C<br>Tg 540°C<br>Ts 821°C | 750°C | 90 SECONDS | 800Kgf | 500°C | 300Kgf | 10 MINUTES |

※ Tg REPRESENTS GLASS TRANSITION TEMPERATURE, AND Ts REPRESENTS SOFTENING POINT.

FIG. 10

| STACKED METAL THIN FILM | FILM THICKNESS [μm] (TOTAL FILM THICKNESS) | THICKNESS OF FORMED GLASS [mm] | GLASS MATERIAL AND DIE RELEASE PERFORMANCE [NUMERALS INDICATE NUMBER OF TIMES OF ACHIEVED FORMING PROCESSES] | | | | | ADHESIVE PERFORMANCE FOR OPTICAL FIBER |
|---|---|---|---|---|---|---|---|---|
| | | | CRYSTALLINE GLASS | CHEMICALLY TEMPERED GLASS | BOROSILICATE OPTICAL GLASS | BOROSILICATE GLASS | | |
| Pt (EXAMPLE 1) | 0.2 (0.20) | 0.6t | – | – | – | – | | – |
| | | 3.0t | ○ 100 | ○ 100 | ○ 100 | ○ 70 | | ○ |
| | | 5.0t | ○ 500 | ○ 500 | ○ 500 | ○ 500 | | ○ |
| Ni+Pt (EXAMPLE 2) | 0.05+0.2 (0.25) | 0.6t | – | – | – | – | | – |
| | | 3.0t | ○ 500 | ○ 500 | ○ 500 | △ BREAKAGE 300 | | ○ |
| | | 5.0t | ○ 500 | ○ 500 | ○ 500 | ○ 500 | | ○ |
| Ni+(Pt–Ir) (EXAMPLE 3) | 0.05+0.2+0.2 (0.45) | 0.6t | – | – | – | – | | – |
| | | 3.0t | ○ 500 | ○ 500 | ○ 500 | △ BREAKAGE 500 | | ○ |
| Ni+(Pt–Ir)+Pt (EXAMPLE 4) | 0.1+1.45+1.45 (3.00) | 0.6t | ○ 1000 | ○ 1000 | ○ 1000 | ○ 1000 | | ◎ |
| | | 3.0t | ○ 1000 | ○ 1000 | ○ 1000 | ○ 1000 | | ◎ |
| Ni+(Pt–Ir)+Pt (EXAMPLE 5) | 0.1+2.45+2.45 (5.00) | 0.6t | ○ 1000 | ○ 1000 | ○ 1000 | ○ 1000 | | ◎ |
| | | 3.0t | ○ 1000 | ○ 1000 | ○ 1000 | ○ 1000 | | ◎ |
| Ni+(Pt–Ir)+Pt (COMPARATIVE EXAMPLE 1) | 0.1+3.45+3.45 (7.00) | 0.6t | FORMING PROCESS WAS STOPPED BECAUSE OF DEFECTIVE SHAPE OF DIE AND FILM PEELING OFF. | | | | | |
| | | 3.0t | | | | | | |
| Pt–Ir (COMPARATIVE EXAMPLE 2) | 0.2 (0.20) | 3.0t | ○ 500 | ○ 500 | △ FORMING PERFORMANCE WAS INFERIOR FROM THE FIRST TIME. | × DEPOSITION OCCURRED IN THE THIRD FORMING PROCESS. | | △ |
| Ni+(Pt–Ir) (COMPARATIVE EXAMPLE 3) | 0.05+0.2 (0.25) | 3.0t | ○ 500 | ○ 500 | △ FORMING PERFORMANCE WAS INFERIOR FROM THE FIRST TIME. | × DEPOSITION OCCURRED IN THE THIRD FORMING PROCESS. | | △ |

×: DEFECTIVE △: SLIGHTLY DEFECTIVE ○: GOOD ◎: EXTREMELY GOOD

PRESS-FORMING DIE FOR GLASS ELEMENTS

BACKGROUND OF THE INVENTION

1. Field of the Invention

The present invention relates to a press-forming die for glass elements. In particular, the present invention relates to a die for press-forming glass elements, which makes it possible to form and process glass elements for an optical IC with excellent die release performance.

2. Description of the Related Art

A method for press-forming glass elements by means of a press-forming process has been hitherto used. In general, such a method raises several issues including, for example, the die release performance between the glass element and the forming die after the forming process, the surface roughness of the glass element, and the surface quality such as whether or not any scratch exists. Various countermeasures have been investigated, including, for example, the forming condition and the selection of the material for the forming die.

Highly accurate forming operation is required especially when an optical lens is produced. Further, the material for the die raises several issues including the deterioration of die release performance resulting from the reactivity with glass during the forming process at a high temperature, and the surface scratch on the glass-pressing surface. As a solution for such issues, the following technique has been disclosed. That is, in order to make the surface roughness of the formed optical lens to be several hundredth $\mu$m, a die is used, in which a cemented carbide is used as a base material, and a noble metal thin film, which contains a major component of iridium, is formed in a degree of several $\mu$m on the surface of the cemented carbide (see Japanese Laid-Open Patent Publication No. 61-256931). According to this technique, the forming condition of this method is such that lead oxide glass is used as a lens material, the heating temperature is 630° C., the press operation is performed for 2 minutes at a press pressure of 40 kg/cm$^2$, and the open process temperature after cooling is 380° C.

On the other hand, for example, when a glass element for optical IC is press-formed and processed, the excellent die release performance is an important factor as well in the same manner as in the forming process for the optical lens. However, the highly accurate operation is not necessarily required concerning the surface scratch, i.e., the processing accuracy of the die. Usually, when the die is subjected to grinding processing by using a diamond grinding wheel, it is inevitable (in view of the processing technique) that the surface roughness of about 0.5 $\mu$m remains at most. However, the surface roughness of this degree is within the allowable range when the product is used for the glass element for optical IC.

When the glass element for optical IC is press-formed and processed, the type of the glass material is selected and used depending on the use or application of the glass element for optical IC. The forming condition is different from those used for processing the optical lens as described above. In general, the forming operation for the glass element for optical IC is performed at a high temperature and at a high pressure, in which the press time is short. Further, the glass element for optical IC is used such that V-shaped grooves are formed on the glass substrate by means of the forming operation, and a glass fiber is positioned and arranged in the grooves. In such a case, the glass fiber is fixed by using an adhesive. It is also necessary to consider the adhesive performance during such a process.

SUMMARY OF THE INVENTION

The present invention has been made taking such problems into consideration, an object of which is to provide a die for press-forming glass elements, to be used to produce the glass elements by means of the press-forming process by using a variety of glass materials appropriately selected depending on the use or application of the glass elements, in which an appropriate degree of surface roughness of the glass element is ensured, the die release performance is excellent, and the adhesive performance for an adhesive is also excellent when a glass fiber is arranged in V-shaped grooves formed on a glass substrate.

According to the present invention, there is provided a die for press-forming glass elements, comprising at least a platinum thin film having a thickness of 0.01 to 5 $\mu$m formed on an outermost surface of a press face of a cemented carbide base material.

Those usable as the cemented carbide base material include those containing a major component of tungsten carbide. However, there is no limitation thereto.

As for the thickness of the platinum thin film, a thin layer is sufficiently used provided that the thin film on the die surface is not peeled off due to repeated use. The preferred thickness is determined according to such a viewpoint. The thickness is determined in the same manner for the other aspects of the invention described later on. In the present invention, it is also possible to preferably use the die in which a nickel thin film having a thickness of 0.05 to 0.5 $\mu$m is allowed to intervene between the cemented carbide base material and the platinum thin film.

In a preferred embodiment, it is also possible that an alloy thin film having a thickness of 0.01 to 5 $\mu$m, which contains 10 to 70% by weight of iridium and 30 to 90% by weight of one or more species of metals selected from metals of the platinum group except for iridium, is allowed to intervene between the cemented carbide base material and the platinum thin film. In this embodiment, it is more preferable that the species of metal of the platinum group except for iridium is only platinum.

The die constructed as described above makes it possible to perform the press-forming operation in which the die release performance is excellent without any adhesion or deposition of softened glass material onto the die, even in the case of the use of any one of various glass materials selected depending on the use or application of the glass element, including, for example, crystalline glass materials (non-crystalline materials), chemically tempered glass materials (materials before the ion exchange treatment), and borosilicate glass. Further, V-shaped grooves are formed on the glass substrate as the material for the glass element, and an optical fiber is arranged in the grooves by using an adhesive. Therefore, the adhesive performance is excellent for the optical fiber to be glued to the glass substrate.

It is preferable that the glass element subjected to the press-forming has a surface roughness (Rmax) within a range of 0.4 to 1.2 $\mu$m.

In the present invention, the glass element for optical IC, which belongs to the glass element, is not necessarily subjected to precision machining into one having an extremely small degree of surface roughness. Especially, for example, when the predetermined grooves for embedding the optical fiber are provided by means of the press-forming on a connector part for optically coupling the optical fiber and the IC chip, it is sufficient to give a processing accuracy in such a degree that the optical fiber can be positioned at a submicron level.

An allowable value in view of the positioning accuracy for the optical fiber (single mode), i.e., an upper limit value of the surface roughness of the glass element is preferably not more than 1.2 µm as represented by Rmax, more desirably not more than 1.0 µm. On the other hand, from a viewpoint to improve the adhesive performance for the glass fiber to be glued to the glass substrate, it is preferable to increase the adhesion area by providing a certain degree of surface roughness. A lower limit value of the surface roughness of the glass element is preferably not less than 0.4 µm as represented by Rmax, more desirably not less than 0.5 µm.

The range of the surface roughness is especially preferred when the glass surface is metallized to fix and secure the optical fiber by means of soldering. The surface roughness of the glass element is herein used as an evaluation standard. However, the surface roughness of the glass element is equivalent to the roughness of the forming surface of the die in the case of the glass press-forming process in which transfer is effected in a well suited manner.

The press-forming die according to the present invention is excellent in die release performance. The die is also excellent in adhesive performance for the optical fiber adhered to the glass substrate by the aid of an adhesive, and the die is sufficient to ensure the processing accuracy as described above. The press-forming die according to the present invention is more preferably used for such use or application.

When the glass element is press-formed by using the press-forming die according to the present invention, a difference in die release performance remarkably appears by using a glass material having a softening point of not less than 600° C.

The softening point of the glass material differs as follows. That is, for example, the softening point of a crystalline glass material (produced by NGK Insulators, Ltd., trade name: Miracron PP-4) is about 550° C. The softening point of an optical glass material (produced by NGK Insulators, Ltd., trade name: Miracron PC-4) is about 580° C. The softening point of a borosilicate optical glass (BK-7) is about 620° C. The softening point of a borosilicate glass (produced by Corning, trade name: Pyrex) is about 820° C. Therefore, when the glass element is formed, the forming condition such as the forming temperature is changed depending on the final use or application. However, even when the forming condition is adjusted as described above, if a glass material having a high softening point is used, the forming temperature is of course high (usually, the forming temperature is about "softening point +10 to 50° C."). For this reason, a tendency is observed, in which the die release performance is deteriorated resulting from the reactivity between the forming die and the glass material and the surface oxidation of the forming die. This tendency is conspicuous when the softening point of the glass material exceeds 600° C.

The use of the forming die according to the present invention provides the forming technique in which the die release performance is extremely excellent regardless of the type of the glass material, especially when a glass material having a high softening point is used. The phenomenon of the surface oxidation of the forming die is conspicuous in the case of the conventional material such as a Pt—Ir alloy. Even when the forming operation is performed in a nitrogen gas atmosphere as a means to avoid the oxidation, it is difficult to completely dissolve the drawback, because the nitrogen gas itself to be used contains oxygen gas in a degree of 10 ppm. On the contrary, the use of the press-forming die according to the present invention, in which the Pt thin film that is relatively difficult to be oxidized is formed on the outermost surface of the press face, makes it possible to preferably perform the press-forming operation even in the nitrogen gas atmosphere.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 conceptually illustrates a state in which a glass material is pressed by using the die according to the embodiment of the present invention;

FIG. 8A schematically shows a state before an optical device is assembled by using the connector part member shown in FIG. 7B;

FIG. 8B schematically shows a state after the optical device is assembled by using the connector part member;

FIG. 9 shows a table illustrating a basic glass press forming condition; and

FIG. 10 shows a table illustrating results of the forming process.

DESCRIPTION OF THE PREFERRED EMBODIMENTS

Preferred embodiments of the die for press-forming glass elements according to the present invention will be explained below with reference to FIGS. 1 to 10. Explanation will be made later on for a grooved connector part (fiber array) for optically coupling an optical fiber and an IC chip, as final use or application of the glass element formed in accordance with the embodiments of the present invention.

The press-forming dies corresponding to the respective embodiments of the present invention are prepared as follows.

At first, a press-forming die (hereinafter simply referred to as "die") 10, in which no thin film is formed on the press face, is prepared. The press face of the die 10 is composed of a material containing a major component of tungsten carbide. The base material of the die has the cylindrical press face having a diameter of 50 mm with a thickness of 10 mm.

In a preferred aspect of the present invention, there is provided a die for press-forming glass elements, comprising:
 a main body portion comprising a cemented carbide base material, the main body portion having at least two groups of ridge-shaped projections extending from a surface thereof, the groups being spaced from one another along the surface and each group containing at least two, substantially identical ridges in the shape of an inverted V; and
 a film formed on the main body portion, having a total film thickness of about 0.01–5 μm, the film comprising at least a platinum thin film layer having a thickness greater than at least 0.01 μm on the outermost surface of the film.

In accordance with an aspect of the invention, the ridge-shaped projections are elongated in a direction substantially perpendicular to the direction in which the groups are spaced from one another. In accordance with another aspect of the invention, the groups are substantially parallel to one another.

Figure 1A:
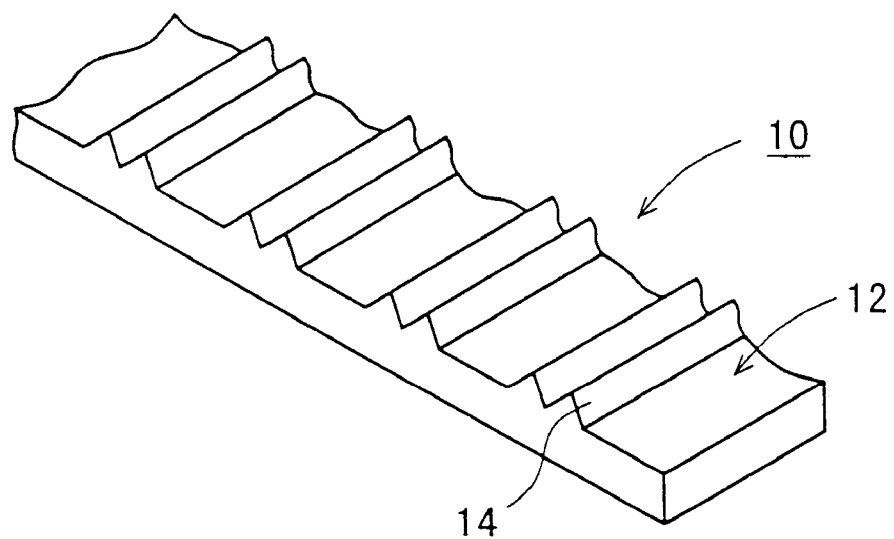
FIG. 1A shows a partial perspective view illustrating a state in which a press face of a die (master die) according to an embodiment of the present invention is disposed upward.

As shown in FIG. 1A, ridge-shaped projections 14 each having a predetermined length are formed on the press surface 12 of the die 10 by means of grinding processing. The grinding processing is performed such that the projections 14 are formed at a pitch of 250 μm by using a diamond trapezoidal grinding wheel (metal #1500), and the finish processing is carried out by using a microgrinder. The projection 14 has a shape which corresponds to the V-shaped recess 22 (described later on) formed on the grooved glass element member for connector part formed by using the die 10. In this embodiment, the number of projections 14 is 2×20 cores. A large number of glass elements are collectively formed with one sheet of glass material, and then the respective connector part members are cut out therefrom.

Figure 1B:
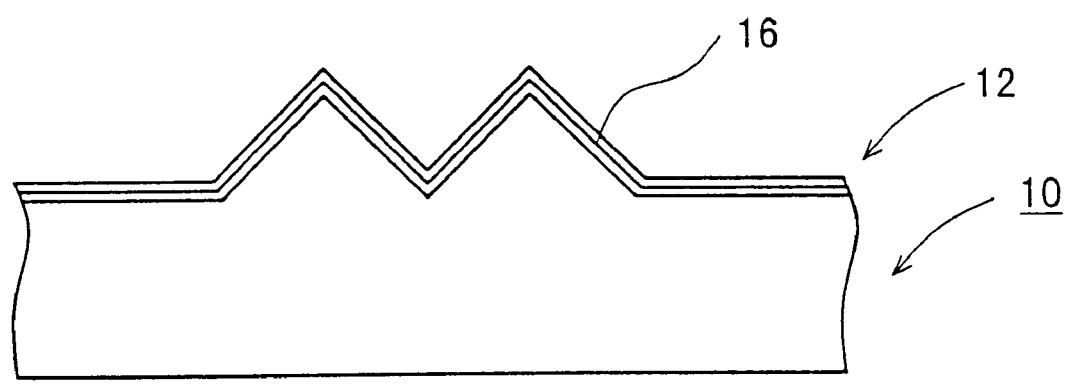
FIG. 1B shows a partial magnified view illustrating one unit of ridge-shaped projections provided on the press face, depicting a state in which several metal thin films are stacked on a base material.

Next, as shown in FIG. 1B, a metal thin film 16 is formed on the press face 12 of the die 10 by means of the sputtering method. In Example 1, a die 10 is prepared, in which a platinum film having a thickness of 0.2 μm is stacked (total film thickness: 0.20 μm). In Example 2, a die 10 is prepared, in which a nickel thin film having a thickness of 0.05 μm is stacked beforehand, and a platinum film having a thickness of 0.2 μm is stacked thereon (total film thickness: 0.25 μm).

Similarly, in Example 3, a die 10 is prepared, in which a nickel thin film having a thickness of 0.05 μm, a platinum-iridium alloy thin film having a thickness of 0.2 μm (platinum content: 40% by weight, iridium content: 60% by weight), and a platinum thin film having a thickness of 0.2 μm are stacked in this order on the base material surface (total film thickness: 0.45 μm).

In Example 4, a die 10 is prepared, in which a nickel thin film having a thickness of 0.1 μm, a platinum-iridium alloy thin film having a thickness of 1.45 μm (platinum content: 40% by weight, iridium content: 60% by weight), and a platinum thin film having a thickness of 1.45 μm are stacked in this order on the base material surface (total film thickness: 3.00 μm). In Example 5, a die 10 is prepared, in which a nickel thin film having a thickness of 0.1 μm, a platinum-iridium alloy thin film having a thickness of 2.45 μm (platinum content: 40% by weight, iridium content: 60% by weight), and a platinum thin film having a thickness of 2.45 μm are stacked in this order on the base material surface (total film thickness: 5.00 μm).

On the other hand, in Comparative Example 1, a die 10 is prepared, in which only a platinum-iridium alloy thin film having a thickness of 0.2 μm (platinum content: 40% by weight, iridium content: 60% by weight) is stacked on the base material surface (total film thickness: 0.20 μm). In Comparative Example 2, a die 10 is prepared, in which a nickel thin film having a thickness of 0.05 μm, and a platinum-iridium alloy thin film having a thickness of 0.2 μm (platinum content: 40% by weight, iridium content: 60% by weight) are stacked in this order on the base material surface (total film thickness: 0.25 μm).

In Comparative Example 3, a die 10 is prepared, in which a nickel thin film having a thickness of 0.1 μm, a platinum-iridium alloy thin film having a thickness of 3.45 μm (platinum content: 40% by weight, iridium content: 60% by weight), and a platinum thin film having a thickness of 3.45 μm are stacked in this order on the base material surface (total film thickness: 7.00 μm).

Next, four types of glass plates having different softening points are prepared as materials for the connector part member, i.e., crystalline glass (produced by NGK Insulators, Ltd., trade name: Miracron PP-4, softening point: 550° C.), chemically tempered glass (produced by NGK Insulators, Ltd., trade name: Miracron PC-4, softening point: 574° C.), borosilicate optical glass (BK-7, softening point: 620° C.), and borosilicate glass (produced by Corning, trade name: Pyrex, softening point: 821° C.). In the following description, the four types of glasses are referred to as "crystalline glass", "chemically tempered glass", "borosilicate optical glass", and "borosilicate glass" respectively.

Each of the glass plates has a size of 50×50 mm. Those having thicknesses of 0.6t, 3.0t, and 5.0t are prepared for each type of the glass plates.

As shown in FIG. 9, the forming process is performed under forming conditions which are different from each other depending on the types of the glass materials.

The forming procedure is shown in FIG. 2. That is, the predetermined glass material 18 is set to perform the press operation under the condition in which the press pressure is 800 kgf, the press time is 90 seconds, and the press temperature depends on the type of the glass material 18. After that, the cooling operation is performed to obtain a temperature corresponding to the type of the glass material 18, and then the press is open. Further, the secondary press operation is performed at a press pressure of 300 kgf with a cycle type of 8 to 10 minutes (a period of time required to raise the temperature from ordinary temperature to the forming temperature and lower the temperature to ordinary temperature) depending on the type of the glass material 18.

Figure 3A:
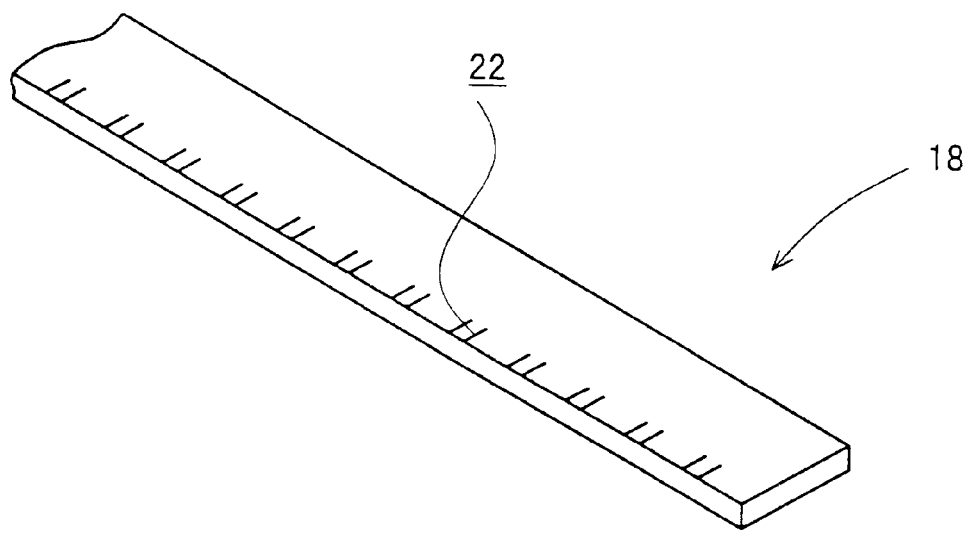
FIG. 3A shows a perspective view illustrating a state in which V-shaped recesses are formed on the glass material shown in FIG. 2.
Figure 3B:
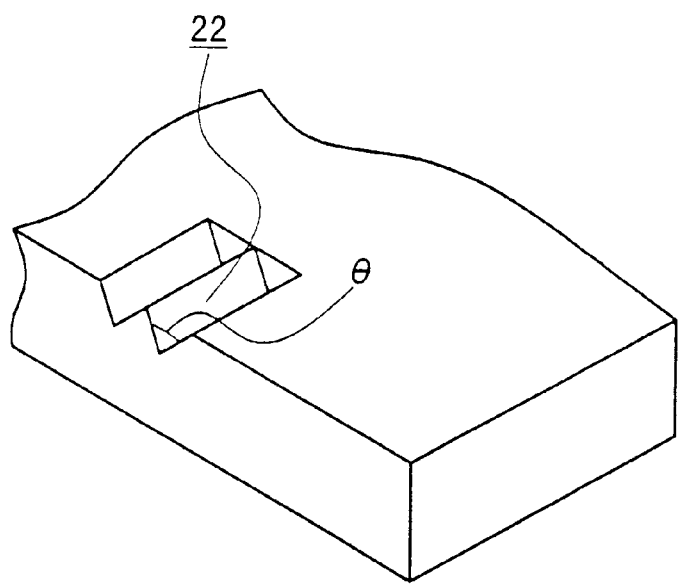
FIG. 3B shows a magnified perspective view illustrating a pair of recesses described above.

As shown in FIG. 3A, a plurality of glass elements to be used as the connector part member are formed on one sheet of the glass material 18, each of the glass elements having two V-shaped recesses 22. As shown in FIG. 3B, the aperture angle (θ) of the recess is 70°, which corresponds to a standard optical fiber (diameter: 125 μm) to be arranged in the recesses 22.

Results of the forming process are shown in a table depicted in FIG. 10. The evaluation was made for four criteria concerning the number of times of forming processes, the die release performance, the surface roughness of the glass material, and the adhesive performance for the optical fiber to be arranged.

At first, explanation will be made for results of the evaluation for the number of times of forming processes, the die release performance, and the surface roughness.

The following evaluation methods were adopted. That is, as for the number of times of forming processes and the die release performance, the number of times of achieved forming processes with good die release performance was observed. As for the surface roughness, the surface roughness Rmax was measured and calculated in accordance with an authentic method for a formed product obtained in the 500th forming process.

At first, concerning Examples 1 to 5, for example, the following results were obtained for those having the thickness of the glass plate of 3.0t. In Example 1, the number of times of achieved forming processes with good die release performance was 100 times for the crystalline glass, the chemically tempered glass, and the borosilicate optical glass, while the number of times was 70 times for the borosilicate glass.

In Example 2, the number of times of achieved forming processes with good die release performance was 500 times for the crystalline glass, the chemically tempered glass, and the borosilicate optical glass, while the number of times was 300 times for the borosilicate glass. In Example 3, the number of times was 500 times for all of the four types of the glass materials.

In Examples 4 and 5, the number of times was increased up to 1000 times for all of the four types of the glass materials. It is understood that the number of times of forming processes is increased twice as compared with Example 3.

The surface roughness was within the predetermined range (0.4 to 1.2 μm) in all of Examples 1 to 5 in which good products were obtained.

On the contrary, both of Comparative Examples 1 and 2 had an identical tendency. In the case of the borosilicate optical glass, the die release performance was inferior upon and after the first forming process. In the case of the borosilicate glass, the deposition of the glass was observed on the press-forming die upon and after the third forming process.

In Comparative Example 3, the defective shape of the die occurred, and the film peeling off arose. In this case, the forming process was stopped.

Next, evaluation was made for the adhesive performance when the optical fiber was fixed with an ultraviolet-curable type epoxy resin adhesive to the V-shaped recesses 22 of each of the press-formed connector part members made of glass. Specifically, after the heat cycle (40° C. to 85° C.) was carried out for two weeks, evaluation was made by means of the shearing test for the adhesive strength between the V-grooved substrate (see the connector part member 30 shown in FIG. 7A) and the fiber-fixing substrate (see the cover member 36 shown in FIG. 7A).

Obtained results are shown in the table depicted in FIG. 10. The adhesive performance was good for all of the glass materials in respective Examples 1 to 5 in which the Pt thin film was formed on the outermost surface of the press face of the forming die. Especially, excellent results were obtained in Examples 4 and 5 in which the total film thicknesses were 3 μm and 5 μm respectively, as compared with Examples 1 to 3.

On the contrary, in Comparative Examples 1 and 2 in which the Pt—Ir thin film was formed on the outermost surface of the press face of the forming die, some products were not excellent in adhesive performance. In Comparative Example 3, the defective shape of the die and the film peeling off occurred, resulting in stoppage of the forming process. Therefore, it was impossible to perform the evaluation for the adhesive performance.

The cause of the occurrence of difference in adhesive performance as described above has been investigated. As a result, it is assumed that the following phenomenon affects whether or not the adhesive performance is adequate and whether or not the die release performance is adequate.

Figure 4:
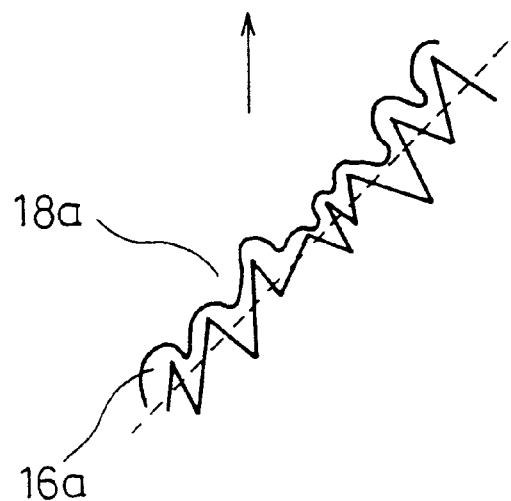
FIG. 4 conceptually illustrates a state of release from the die when the glass material is pressed by using the die according to the embodiment of the present invention.

That is, the die release state is observed as shown in FIG. 4 in the case of the use of the forming die concerning each of Examples 1 to 5 comprising the Pt thin film formed on the outermost surface of the press face of the forming die. The metal thin film 16a, which has had an acute ridge-shaped configuration, is deformed to be in a so-called blunt state. All of forward ends of the blunt ridge-shaped configuration are directed in the die release direction for the glass material 18a, as indicated by the arrow shown in FIG. 4.

Figure 5:
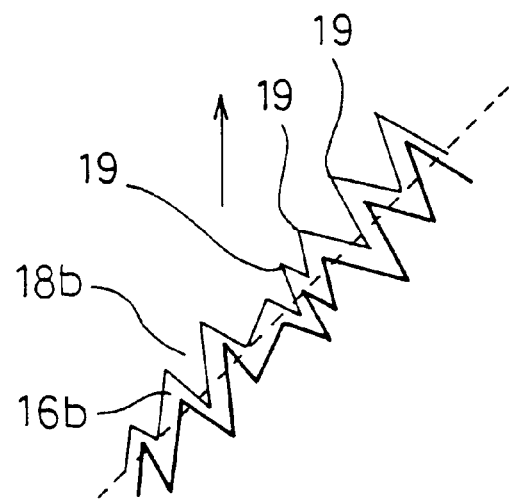
FIG. 5 conceptually illustrates a state of release from a die when the glass material is pressed by using the die concerning a comparative example.

On the contrary, the die release state is observed as shown in FIG. 5 in the case of each of Comparative Examples 1 and 2 comprising the Pt—Ir thin film 16b formed on the outermost surface of the press face of the forming die. An acute ridge-shaped configuration of the Pt—Ir thin film 16b is maintained as its original form. Some of the forward end portions (projections) of the ridge-shaped configuration indicated by reference numeral 19 are approximately perpendicular to the die release direction for the glass material 18a.

It is a matter of course that the forward end portions having the same configuration as those indicated by reference numeral 19 are also formed on the forming dies concerning Examples 1 to 5, immediately after the grinding processing, in the same manner as in Comparative Examples 1 and 2. However, Pt, which is the material for the metal thin film 16a, is a relatively soft metal. Therefore, it is assumed that the apexes of the ridge-shaped projections 14 of the metal thin film 16a are selectively crushed at earlier stages of the press-forming process, causing the deformation as described above.

As a result, the grooves were formed by the press forming by inverting and transferring the shape of the press face on the glass materials 18a, 18b after the die release respectively.

The reason why the adhesive performance is excellent in Examples 1 to 5 based on the use of the die 10 according to the embodiment of the present invention, as compared with Comparative Examples 1 and 2, is considered as follows. That is, the wettability of the adhesive is improved, because the deepest portion of the groove of the glass material 18 has the blunt configuration. In other words, the adhesive reliably penetrates into the deepest portion of the groove of the glass material 18a, and the adhesive area is substantially increased.

The die release performance is affected by the relative relationship between the direction of the forward end portions 19 of the ridge-shaped configuration and the release direction as described above. In Comparative Examples 1 and 2, the glass invaded into the groove between the ridge-shaped projections 14 of the die tends to be caught during the release process. On the contrary, in Examples 1 to 5 based on the use of the die 10 according to the embodiment of the present invention, the ridge-shaped configuration is deformed, and the direction of the forward ends of the ridge-shaped configuration is coincident with the direction of die release. Accordingly, it is assumed that the glass invaded into the groove between the projections 14 is smoothly disengaged, and the good die release performance is obtained. The use of the die 10 which excellent in die release performance as described above prolongs the service life of the die 10.

Especially, it is assumed that the twice-increasing effect on the number of times of forming processes obtained in Examples 4 and 5 is caused by the following factors.

As for the relatively soft Pt film layer, the ridge-shaped projections 19 on the surface of the surface roughness are crushed by the glass at the earlier stages of the forming process, giving the configuration as shown in FIG. 4. Concerning this phenomenon, the displacement amount of the film surface is larger in the thick film than in the thin film.

It is assumed that the film formed to have the thick thickness is easily deformed in a microscopic manner into the shape suitable for the release from the die. Accordingly, the wear resistance of the die is improved, and the number of times of forming processes is increased.

Judging from this fact, it is conceived that the thicker the film is, the more improved the die release performance is. However, as illustrated in Comparative Example 3, when the total film thickness exceeds 5 $\mu$m, then the strength of the film is deteriorated, and the crack occurs. In such a case, the shape of the die 10 is distorted. On the other hand, when the film thickness is thin, especially when the platinum layer at the outermost surface is in a degree of not more than 0.01 $\mu$m, then the platinum disposed in the outermost layer diffuses toward the platinum-iridium disposed in the intermediate layer, and consequently the outermost layer is substantially composed of platinum-iridium. For this reason, it is feared that the effect as described above cannot be obtained.

Therefore, it is desirable that the forming process is performed with the film thickness considering the aforementioned facts. It is preferable that the total film thickness is within the range of 0.01 to 5.0 $\mu$m.

In general, in the glass press-forming process, the thinner the wall of the glass material is, or the thinner the thickness is, the more difficult the press-forming process is, because of the following reason. That is, when the pressure is applied to the softened glass by using the die 10, the thin plate has a small area for the glass to make movement in the thickness direction in which the shape is greatly changed, as compared with the thick plate. In Examples 4 and 5, the thick total film thickness of the surface film of the die improves the die release performance for the die and the glass, the range of press condition is simultaneously widened, and it is possible to perform the forming process even under the condition in which cracks in formed products and deposition due to melting have hitherto occurred when the thin film is used.

The borosilicate glass is a material which is difficult to be press-formed as compared with the other glass materials, and it involves, for example, a problem that the deposition to the die and the cracks of formed products tend to occur. However, as illustrated in Examples 4 and 5, the thick total film thickness of the surface film of the die improves the die release performance for the die 10 and the glass, the range of press condition is simultaneously widened, and the forming performance is improved.

As illustrated in Examples 3 to 5, the existence of the thin film intermediate layer such as the platinum-iridium alloy thin film provides the method which is effective to improve the tight contact strength with respect to the platinum film formed at the outermost surface. The platinum film disposed at the outermost surface and the platinum-iridium alloy thin film disposed at the intermediate layer partially contain the identical element (platinum in this case). Therefore, the both films cause so-called diffusion in vicinity of the interface. Thus, the tight contact degree of the film is improved.

The grooved connector part, which is formed by using the die 10 according to the embodiment of the present invention, has its surface which possesses the certain roughness. However, since the edge-shaped portions on the surface in the groove are blunt, the surface is in a smoothed state as viewed in a microscopic manner. Therefore, such a grooved connector part has less possibility to damage the optical fiber to be arranged in the groove, and thus it is preferably used as a substrate for securing the optical fiber.

Next, an explanation will be given for the grooved connector part (fiber array) thus formed for optically coupling the optical fiber and the IC chip.

Figure 6:
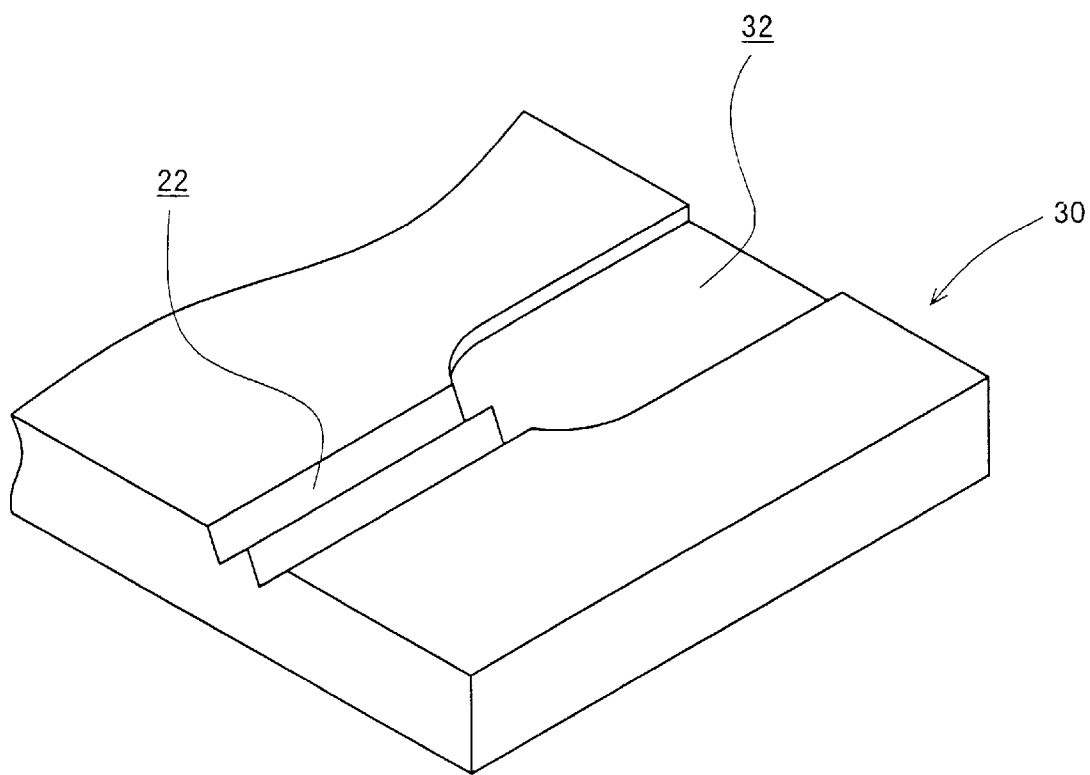
FIG. 6 shows a perspective view illustrating a connector part member for arranging an optical fiber based on the use of the glass material shown in FIGS. 3A and 3B.

Before a plurality of connector part members each having the two V-shaped recesses 22 are cut out from one sheet of glass material 18 shown in FIG. 3A, a die having a wide-width projection, which is different from the die according to the present invention, is used to form a wide-width recess which continues to the recesses 22 on the connector part members each having the two V-shaped recesses 22 formed on one sheet of glass material 18. After that, the plurality of connector part members are cut out. FIG. 6 shows one unit of the connector part member 30 finally cut out, comprising the V-shaped recesses 22 and the wide-width recess 32 continued thereto. The two V-shaped recesses 22 and the wide-width recess 32 disposed in an extended manner therefrom are formed at a central portion in the widthwise direction.

Figure 7A:
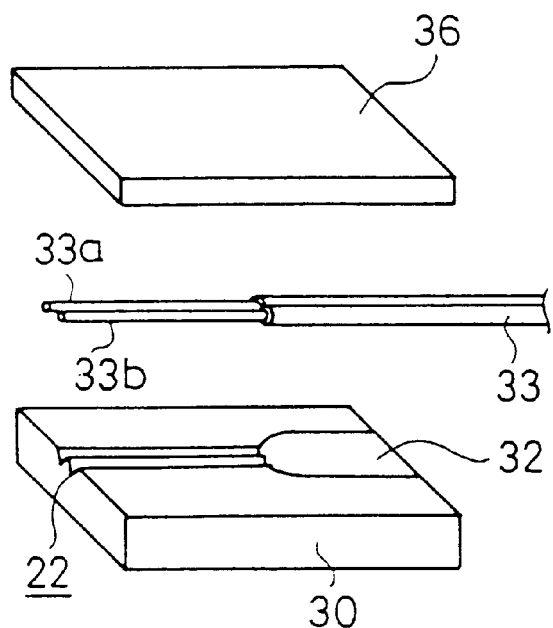
FIG. 7A schematically shows a step illustrating a state before the optical fiber is secured to the connector part member sown in FIG. 6.
Figure 7B:
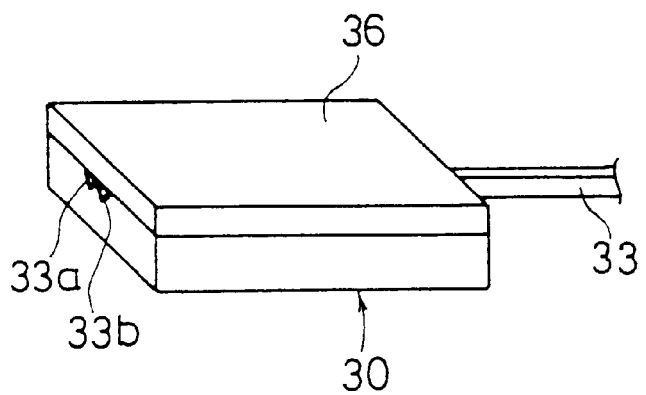
FIG. 7B schematically shows a step illustrating a state after the optical fiber is secured to the connector part member.

FIGS. 7A and 7B show steps of installing an optical fiber 33 to the connector part member 30, placing a cover member 36 thereon, and fixing the optical fiber 33 to the connector part member 30. FIG. 7A shows a state before the fixation, and FIG. 7B shows a state after the fixation. Ends 33a, 33b of the optical fiber 33 are attached to the two V-shaped recesses 22 of the connector part member 30, and they are secured by placing the cover member 36 thereon.

FIGS. 8A and 8B show a step of joining the optical IC chip and the connector part member. A connector part member 38 secured with an optical fiber 33 is joined to the optical IC chip 42. Another unit of connector part member 40 is connected to the other end of the optical IC chip 42. The connector part member 40 is further connected with an optical fiber 44 and a coupler 46 to be connected to an unillustrated light source disposed thereover. The optical IC chip 42 comprises an optical waveguide 50 having a predetermined shape formed on a substrate. A phase modulator 52 and a polarizer 54 are carried on the optical waveguide 50.

In this embodiment, the optical fiber 33 and the optical fiber 44 to be finally connected to the light source are optically coupled to one another while being restricted for the joining direction with respect to the optical IC chip 42 by the aid of the connector part members 38, 40. Accordingly, when the optical fibers 33, 44 and the optical IC chip 42 are joined to one another, it is extremely easy to handle them. Further, it is unnecessary to consider the joining direction one by one. Thus, it is possible to perform the efficient operation for the optical coupling as described above.

As explained above, the use of the die for press-forming glass elements according to the present invention to perform the press-forming process makes it possible to ensure the surface roughness in the degree necessary and sufficient for the use, and obtain the glass element which is excellent in die release performance after the forming process, when a variety of glass materials are used. Further, it is possible to obtain the good adhesive performance when the optical fiber is arranged in the V-shaped grooves formed on the glass substrate by using the adhesive.

What is claimed is:

1. A die for press-forming glass elements, comprising:
   a main body portion comprising a cemented carbide base material, said main body portion having at least two groups of ridge-shaped projections extending from a surface thereof, said groups being spaced from one another along said surface and each group containing at least two, substantially identical ridges in the shape of an inverted V; and a film formed on said main body portion, having a total film thickness of about 0.01–5 µm, said film comprising at least a platinum film layer having a thickness greater than at least 0.01 µm on the outermost surface of said film, wherein said platinum thin film layer has a sufficiently low surface roughness to press-form a glass element having a surface roughness within a range of 0.4 to 1.2 µm.

2. The die for press-forming glass elements according to claim 1, wherein said ridge-shaped projections are elongated in a direction substantially perpendicular to the direction in which said groups are spaced from one another.

3. The die for press-forming glass elements according to claim 2, wherein said groups are substantially parallel to one another.

4. The die for press-forming glass elements according to claim 1, said film further comprising an alloy thin film having a thickness of 0.01 to 5 µm, which contains 10 to 70% by weight of iridium and 30 to 90% by weight of at least one metal of the platinum group except for iridium, interposed between said main body portion and said platinum thin film.

5. The die for press forming glass elements according to claim 4, wherein said metal of the platinum group is platinum.

6. The die for press-forming glass elements according to claim 1, wherein the die can be used to press-form a glass material having a softening point of at least 600° C.

* * * * *

UNITED STATES PATENT AND TRADEMARK OFFICE
CERTIFICATE OF CORRECTION

PATENT NO. : 6,354,111 B1
DATED : March 12, 2002
INVENTOR(S) : Takashi Ota et al.

It is certified that error appears in the above-identified patent and that said Letters Patent is hereby corrected as shown below:

<u>Title page,</u>
Item [73], Assignee, "NGK Insulators Ltd.; NGK Optoceramics, Ltd., both of Nagoya (JP)" should read -- NGK Insulators, Ltd.; NGK Optoceramics Co., Ltd., both of Nagoya (JP) --

Signed and Sealed this

Twentieth Day of May, 2003

JAMES E. ROGAN
*Director of the United States Patent and Trademark Office*